US008949936B2

(12) United States Patent
Roberts et al.

(10) Patent No.: US 8,949,936 B2
(45) Date of Patent: Feb. 3, 2015

(54) HOSTED NETWORK DEVICE USER INTERFACE

(75) Inventors: David Roberts, Redmond, WA (US); Brian Larsen, Bothell, WA (US); Aaron Cunningham, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1030 days.

(21) Appl. No.: 12/141,938

(22) Filed: Jun. 19, 2008

(65) Prior Publication Data

US 2009/0320098 A1 Dec. 24, 2009

(51) Int. Cl.
*H04L 29/06* (2006.01)
*H04L 12/28* (2006.01)
*H04L 12/24* (2006.01)

(52) U.S. Cl.
CPC .......... *H04L 12/282* (2013.01); *H04L 12/2818* (2013.01); *H04L 41/22* (2013.01); *H04L 63/20* (2013.01)
USPC ........................................................... 726/3

(58) Field of Classification Search
USPC ............................................................ 726/3
See application file for complete search history.

(56) References Cited

U.S. PATENT DOCUMENTS

| | | | |
|---|---|---|---|
| 5,832,298 A * | 11/1998 | Sanchez et al. ................... 710/8 |
| 6,324,588 B1 | 11/2001 | Desruisseaux et al. |
| 6,732,179 B1 * | 5/2004 | Brown et al. ................... 709/229 |
| 6,757,723 B1 | 6/2004 | O'Toole et al. |
| 6,779,004 B1 | 8/2004 | Zintel |
| 7,085,814 B1 | 8/2006 | Gandhi et al. |
| 7,194,689 B2 | 3/2007 | Manni et al. |
| 7,197,580 B2 | 3/2007 | Rosenbloom et al. |
| 7,275,092 B2 | 9/2007 | Copp |
| 7,283,623 B2 | 10/2007 | Burns |
| 7,325,057 B2 | 1/2008 | Cho et al. |
| 7,577,910 B1 * | 8/2009 | Husemann et al. ........... 715/744 |
| 7,613,893 B2 * | 11/2009 | Saint-Hilaire et al. ........ 711/170 |
| 2001/0042202 A1 * | 11/2001 | Horvath et al. ............... 713/154 |
| 2002/0078161 A1 | 6/2002 | Cheng |
| 2002/0111999 A1 * | 8/2002 | Andersson ..................... 709/203 |
| 2002/0184165 A1 * | 12/2002 | Deboer et al. ..................... 706/1 |
| 2003/0018889 A1 * | 1/2003 | Burnett et al. ................ 713/153 |
| 2003/0041142 A1 * | 2/2003 | Zhang et al. .................. 709/224 |
| 2003/0236865 A1 * | 12/2003 | Anthe et al. .................. 709/220 |
| 2004/0111490 A1 | 6/2004 | Im et al. |
| 2004/0133896 A1 | 7/2004 | Lym et al. |
| 2005/0080897 A1 * | 4/2005 | Braun et al. .................. 709/225 |
| 2005/0152287 A1 | 7/2005 | Yokomitsu et al. |

(Continued)

OTHER PUBLICATIONS

Provos, Niels. "Improving Host Security with System Call Policies." Usenix Security. vol. 3. 2003.*

(Continued)

*Primary Examiner* — Harris Wang
(74) *Attorney, Agent, or Firm* — John Jardine; Kate Drakos; Micky Minhas

(57) ABSTRACT

A system and method of hosting a user interface of a network device are provided. A particular method includes receiving a request at a server to display a user interface of the network device, authenticating an end user device to validate an identity of a user, and communicating display information of the user interface of the network device to the end user device for display. The server hosted user interface permits monitoring and interactions with the network device by a user of the end user device.

15 Claims, 3 Drawing Sheets

(56) References Cited

U.S. PATENT DOCUMENTS

| | | | |
|---|---|---|---|
| 2005/0159823 | A1 | 7/2005 | Hayes et al. |
| 2005/0160157 | A1 | 7/2005 | Collier et al. |
| 2005/0186913 | A1* | 8/2005 | Varanda ............... 455/67.11 |
| 2006/0080382 | A1 | 4/2006 | Dutta et al. |
| 2006/0235953 | A1 | 10/2006 | Meier |
| 2006/0259184 | A1 | 11/2006 | Hayes et al. |
| 2007/0143489 | A1 | 6/2007 | Pantalone |
| 2007/0179955 | A1* | 8/2007 | Croft et al. ................ 707/9 |
| 2008/0218309 | A1* | 9/2008 | Steenstra et al. ........... 340/5.8 |
| 2008/0270597 | A1* | 10/2008 | Tenenti ................ 709/224 |
| 2009/0320098 | A1* | 12/2009 | Roberts et al. ............. 726/3 |
| 2009/0320113 | A1 | 12/2009 | Larsen |

OTHER PUBLICATIONS

A Cost-effective Approach for Developing Application-control GUIs for Virtual Environments Andujar, C. ; Fairen, M. ; Argelaguet, F., 3D User Interfaces, 2006. 3DUI 2006. IEEE Symposium Publication Year: 2006 , Page(s): 45 - 52.*

Elrick, et al., "Protocol and Interface for Device Control in the Home Environment", 2005. pp. 1-145.

Neil Henderson and Geoff Kendall. "Portable Design" http://www.portabledesign.com/article?article_id=75.

"GuestGate Internet Access Device", 2004. 2 pages.

Non-Final Rejection, U.S. Appl. No. 12/141,924, dated Dec. 22, 2011, 10 pages.

Response to Final Rejection, U.S. Appl. No. 12/141,934, dated Nov. 8, 2011, 11 pages.

Final Rejection, U.S. Appl. No. 12/141,934, dated Aug. 10, 2011, 9 pages.

Response to Non-Final Rejection, U.S. Appl. No. 12/141,934, dated Jun. 1, 2011, 12 pages.

Non-Final Rejection, U.S. Appl. No. 12/141,934, dated Mar. 2, 2011, 9 pages.

Kim, et al., "Design and Implementation of Home Network Using UPnP Middleware for Networked Appliances", IEEE Transactions on Consumer Electronics, Nov. 2002, pp. 963-972, vol. 48, Issue: 4.

Miller, Brent A., "Home Networking with Universal Plug and Play", IEEE Communications Magazine, Dec. 2001, pp. 104-109, vol. 39, Issue: 12.

* cited by examiner

HOSTED NETWORK DEVICE USER INTERFACE

TECHNICAL FIELD

The present disclosure is generally related to a remotely hosted user interface to a network device.

BACKGROUND

Products tailored for home use and for other small networks include user interfaces that are customized for a particular device installation. Configuration pages for each network device are typically designed based on the particular network device capabilities. Typically, the user interface installations are hosted on devices via HyperText Markup Language (HTML), such as a web server stored on the network device. The user interfaces are often dependent on Java Script or another type of browser-based mechanism for network device error checking.

These types of network device user interface installations add costs to deployment of the network devices. Also, the network devices have limited processor and storage resources.

While standardization, localization, and verification are areas where there is a need for improved user interfaces, maintaining a standard user interface across multiple devices and multiple revisions and upgrades of such devices from various vendors is a difficult and complex problem. Standard interfaces may have a common display but due to error checking programming and other coding differences, the user interfaces may not act the same. For each language a network device needs to support, a new firmware file is often created. For example, a router model could have several different firewall versions, such as versions in English, German or French. Some network devices support multiple languages but the number of languages is limited based on the amount of memory and since the language file is local, the language file may be difficult to modify.

SUMMARY

The present disclosure relates to a system and method of hosting a user interface of a network device. In a particular embodiment, the method includes receiving a request at a server to display the user interface of the network device at an end user device, authenticating the end user device to validate an identity of a user, and communicating display information of the user interface of the network device to the end user device for display. The user interface hosted at the server permits end user monitoring and interactions with the network device. The network device may perform various operations, such as network management functions including parental control, firmware updates, firewall configuration, or diagnostics of a network or of the network device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
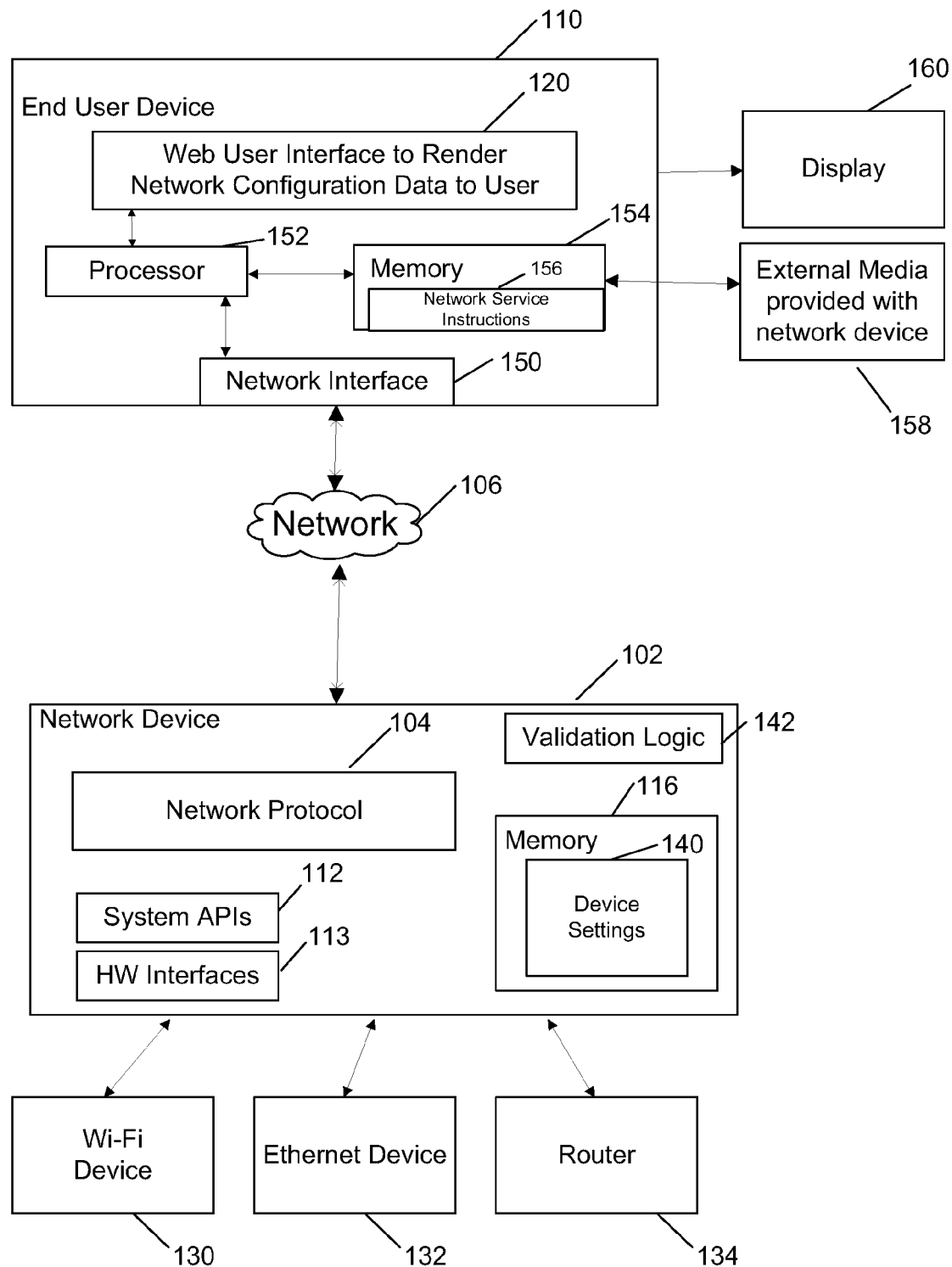
FIG. 1 is a block diagram that illustrates a particular embodiment of a system including a network device having a system application programming interface (API) and an end user device with a web user interface to render network configuration data.

In a particular embodiment, a network device is disclosed that includes at least one application programming interface (API) to support a remotely hosted user interface of the network device. The remotely hosted user interface permits remote access to device settings of the network device. The network device includes validation logic to permit controlled access to the at least one API to support the remotely hosted user interface. The network device also includes a network communication interface to communicate with a computer data network. The network device may provide controlled access to limited aspects of the interface supported by the API in response to receiving security information, such as a session key, user name and password, or a certificate from a remote device.

An end user device, or a hosted web user interface at a server, may access the API at the network device as an interface to remotely host the user interface for display and control of device settings of the network device. The end user device may be a personal computer coupled to the network device via an Internet Protocol (IP) network.

In a particular embodiment, the personal computer includes a processor and a memory including processor executable instructions. The processor executable instructions are executable by the processor to perform operations of a network service application using an integrated user interface at the personal computer device. The network service application includes instructions executable by the processor to make function calls to the API at the network device to retrieve and display device settings of the network device. The device settings are displayable and controllable via the integrated user interface of the personal computer. The network service application may be loaded into the memory of the personal computer from computer readable media that is provided as a package together with the network device for installation and deployment.

Network device user interfaces are often handled via browser-based mechanisms, such as Java Script. By using a network-based service, the network device user interface is moved to a server-based mechanism that can provide a richer experience and can assist the user to verify that the network device is configured correctly. The disclosed system removes a standard user interface stored at the network device and provides a hosted user interface through a network service, a local personal computer utility, or a combination thereof. The disclosed system provides an approach that improves the user experience and can be supported by a service provider on a device class basis. In addition, localization and regionalization of network device configurations may be supported by one or more service providers remotely leading to further improvement in the user experience. Device installation and configuration is implemented using an application programming interface (API) together with a trusted technology such as web services. Network device settings control, status updates, and access applications or functions may be performed using a web-based personal computer user interface. A personal computer having an installed Windows® platform can use certain protocols, such as UpnP, to interact with network devices automatically. Separation of the network device and the user interface that is used to manage the network device by use of hosted services is supported by the API on the network device.

Referring to FIG. 1, a particular embodiment of a system that uses a personal computer utility to support a user interface of a network device is shown. The system includes a representative network device 102, an end user device 110, and a display 160. The end user device 110 may be a personal computer or another type of electronics device such as a cellular telephone. The network device 102 is coupled to the end user device 110 via a distributed computer network 106, such as an Internet network. The network device 102 is coupled to a variety of other devices, such as a representative Wi-Fi device 130, an Ethernet device 132, and a data router 134. The network device 102 includes a network protocol module 104, a computer readable memory 116, and one or more system APIs 112 and hardware (HW) interfaces 113. The one or more system APIs 112 and hardware interfaces 113 are used to communicate with the various types of hardware devices, such as the Wi-Fi device 130, the Ethernet device 132, and the data router 134. The computer readable memory 116 includes device settings 140 for each of the devices supported by the network device 102. In various embodiments, the network device 102 may be a router, a digital picture frame, a personal computer, a media device, a set-top box, a smart telephone, a gaming device, a computer attached electronic device or any combination thereof.

The network protocol module 104 is used to communicate with the computer network 106 and the end user device 110. The end user device 110 may be a computer that includes computer components, such as a processor 152, a memory 154, and a network interface 150. The network interface 150 is used to communicate with the network 106 and is coupled to the processor 152 and the memory 154. The processor 152 is coupled to the memory 154 and may execute computer executable instructions to perform various functions and operations of the personal computer. For example, the processor 152 may execute network service instructions 156 stored in the memory 154. The network service instructions 156 may be retrieved via the network 106 or may be retrieved from local storage, such as from an external media provided with the network device 102, as shown at 158. The external media 158 may be a compact disc or other media device that provides computer readable instructions for performing the network service operations. The processor 152 also is coupled to or executes a hosted web user interface to render network configuration data to a user, as shown at 120. The web user interface to render network configuration data to the user 120 is coupled to display network configuration data via the display 160.

In a particular embodiment, the network device 102 including the system API 112 supports a remotely hosted network device user interface 120. The remotely hosted user interface 120 permits remote access by the end user device 110 to device settings 140 of the network device 102. The network device 102 also includes validation logic 142 to permit controlled access by the end user device 110 to the system APIs 112 to support the remotely hosted user interface 120.

In a particular embodiment, during operation, controlled access to the system APIs 112 is provided to the end user device 110 in response to receiving security information (such as a session key, a user name and password, or a certificate) from the end user device 110. The end user device 110, via the computer network 106, has controlled access to and may use the system APIs 112 of the network device 102 to remotely host a user interface for display and control of the device settings 140 stored in the memory 116 of the network device 102. In a particular embodiment, the user interface of the end user device 110 is integrated with the network service instructions 156. The network service instructions 156 are operative, via the end user device 110, to call the system APIs 112 of the network device 102 to utilize remotely hosted user interface functionality. With the remotely hosted user interface capability, the end user device 110 may make function calls to the system APIs 112 to retrieve and display the device settings 140 from the memory 116. The device settings 140 may be displayable and controllable via the integrated user interface of the end user device 110. Thus, the retrieved device settings 140 may be displayed at the display 160.

In addition, the end user device 110 may interact with a user to control the device settings 140 remotely. In a particular embodiment, the network interface 150 may be an internal interface as shown or may provide access to the network 106 via an Internet gateway device (not shown) which may be external to the end user device 110. The end user device 110 may use the hosted web user interface 120 and may interact with the system APIs 112 of the network device 102 using control functions to acquire information (capabilities, status, logs, etc.), device settings, run network device diagnostics or to perform other interactive configuration operations for the network device 102. The end user device 110 may provide a remotely hosted user interface that is specifically tailored to the particular network device 102, or the remotely hosted user interface may provide a generic user interface that is adjusted based on the particular capabilities of the network device 102.

As an example, a user of the end user device 110 may make changes to configuration data, such as changes to the configuration data of the Wi-Fi device 130 via the web user interface 120. When the user identifies device settings to modify, the end user device 110 connects to the system APIs 112 and interacts with the system APIs 112 to gather information and/or to apply the device settings as desired by the user. In a particular embodiment, the system APIs 112 may be defined in a Device Profile for Web Service (DPWS) format. Use of the DPWS format allows for provision of security features of web services.

Figure 2:
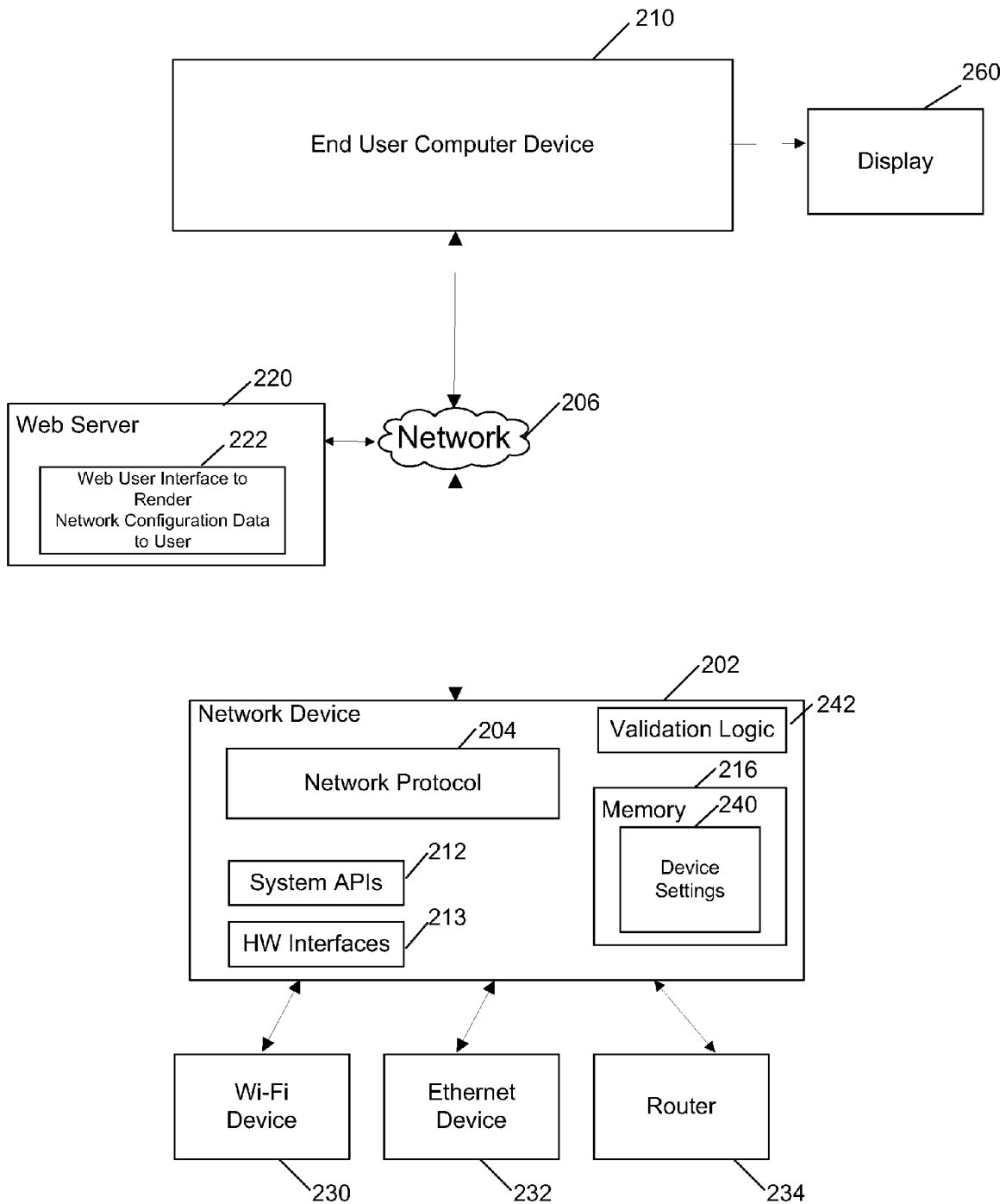
FIG. 2 is a block diagram that illustrates a particular embodiment of a system including a network device having a system API and a web server that hosts a web user interface to render network configuration data.

Referring to FIG. 2, a particular embodiment of a system that includes a network device having system APIs and a web server that provides a hosted web user interface to render network configuration data is shown. The system includes a representative end user computer device 210 coupled to a display 260, a web server 220, and a network device 202. The network device 202 is coupled to the web server 220 via a computer network 206. The web server 220 includes a hosted web user interface 222 to render network configuration data to a user. The network device 202 includes a network protocol interface 204, system APIs 212, hardware (HW) interfaces 213, and computer readable memory 216. The computer readable memory 216 includes device configuration settings 240. The network device 202 is coupled to representative hardware devices, such as a Wi-Fi device 230, an Ethernet device 232, and a router 234. The network device 202 provides for controlled access to system APIs 212 via the remotely located web server 220 over the network 206.

For end user devices 210 that do not include network services applications to provide user interface support, the web server 220 may host a network services application and may provide the user with a network device user interface via a web browser. The web server 220 connects to the system APIs 212 on the network device 202 to modify the device settings 240 or to gather device information such as the device settings 240.

The system allows a user of the end user device 210 to define and apply settings remotely and from any location having access to the network 206 by providing remote access to the web server 220. The system thereby enables legacy operating systems to utilize network device hardware as well as to provide a level of functionality to platforms that do not have sufficient market penetration to justify the costs of a local customized network device configuration user interface. The web server 220 including the hosted web user interface 222 to render network configuration data may provide either open access to the end user device 210 or controlled access using security mechanisms, such as digital certificates, user names and passwords, or other security settings supported by web services functionality. The hosted user interface 222 at the web server 220 may be used to perform a variety of network management functions with respect to the network device 202 including parental controls, firmware updates, firewall configuration, or diagnostics of network elements (such as Wi-Fi device 230, Ethernet device 232, or router 234) or of the network device 202.

In a particular embodiment, a user of the end user device 210 having access to the web server 220 may be a person other than the owner of the network device 202. In this particular case, the user may be granted access by the owner of the network device 202 prior to the end user device 210 receiving the display information of the user interface hosted at the web server 220. The user's access may be limited to selected portions of the hosted user interface 222 or may be limited to selected functions of the hosted user interface 222. The end user device 210 may be authenticated by use of a user name and password, a session key, or a digital certificate. In a particular embodiment, the device settings 240 include configuration data of the network device 202, which may include an Internet Protocol address, a network device identifier, and one or more additional device settings. A combination of devices, such as the web server 220, the end user device 210 and various network devices such as the illustrated network device 202 that is accessible via the computer network 206, may be used to provide integrated services where a particular service is exposed to a user via remotely hosted user interface and devices that are controlled in a collection to provide an integrated service offering. In addition, the web server 220 may provide multiple hosted web user interfaces of different network devices and/or for multiple network device owners, such that the web server 220 may provide network device application services for multiple users and devices on an application server or subscription basis.

Figure 3:
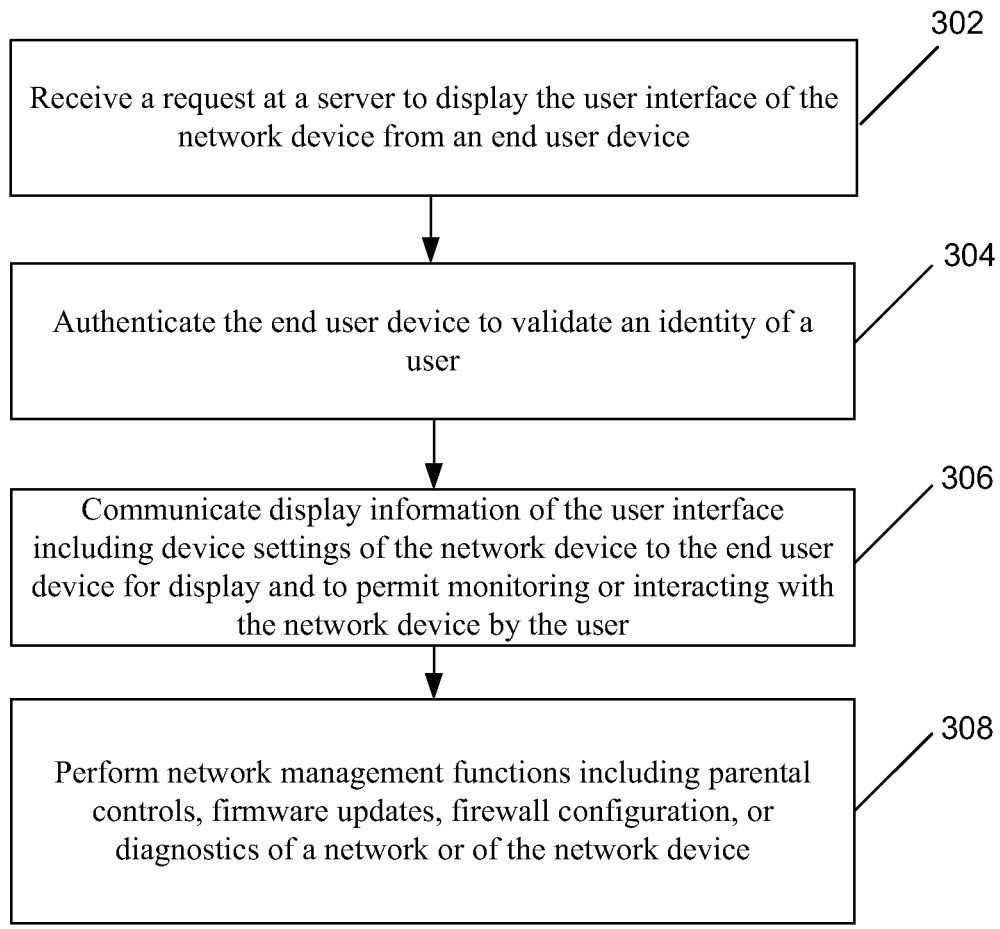
FIG. 3 is a flow diagram that illustrates a particular embodiment of a method of operation of the systems of FIG. 1 and FIG. 2.

Referring to FIG. 3, a particular embodiment of a method of hosting a user interface of a network device is disclosed. The method includes receiving a request at a server to display the user interface of the network device, as shown at 302. The request may be received from an end user device. The method further includes authenticating the end user device to validate an identity of a user or of the end user device, as shown at 304. The method further includes communicating display information of the user interface including device settings of the network device to the end user device for display and to permit monitoring or interacting with the network device by the user, as shown at 306. The method further includes performing network management functions including parental controls, firmware updates, firewall configuration or other diagnostics of a network or of the network device, as shown at 308.

The disclosed system and method provides a server based or personal computer based capability for remotely hosting a user interface to render network configuration data and/or to control such network configuration data of one or more network devices coupled to a computer network. Thus, with the disclosed system and method, a user may remotely access, collect, monitor and/or interact with network configuration data using an enhanced and flexible user interface capability.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of hosting a user interface of a network device, the method comprising:
   receiving a request at a server to display the user interface of the network device at an end user device;
   authenticating the end user device to validate controlled access to at least one application programming interface (API) on the network device, the controlled access only permitting access to limited aspects of the at least one API, wherein the at least one API provides support for the user interface; and
   communicating display information of the user interface including device settings of the network device to the end user device for display and to permit monitoring and interacting with the network device at the user interface, the interacting including modification of previously defined settings of the network device, wherein the modification occurs after establishing access by the end user device to the network device, wherein the network device includes hardware interfaces that are configured to be coupled to a plurality of hardware devices, wherein the plurality of hardware devices includes a data router and a wi-fi device,
   wherein the end user device is configured to specifically tailor the remotely hosted user interface to the network device, and
   wherein the remotely hosted user interface is based on a generic user interface that is modified based on particular capabilities of the network device to customize the remotely hosted user interface with respect to the network device.

2. The method of claim 1, wherein the network device performs network management functions including parental controls, firmware updates, or firewall configuration, of the network device.

3. The method of claim 1, wherein the authenticating the end user device further comprises authenticating an end user.

4. The method of claim 1, wherein the device settings include configuration data of the network device, the configuration data including an Internet protocol address, a network device identifier and at least one additional network device setting.

5. The method of claim 1, wherein the server provides hosted web user interfaces of different network devices, and wherein the server provides network device application services for the different network devices on an application server or subscription basis.

6. A network device comprising:
   at least one application programming interface (API) to support a remotely hosted user interface of the network device wherein the remotely hosted interface is displayed at an end user device, the remotely hosted user interface to permit a user of the end user device to remotely access and modify previously defined device settings of at least one of a plurality of hardware devices, wherein the modification occurs after establishing remote access by the end user device to the network device, the plurality of hardware devices including a data router;
   hardware interfaces that are configured to be coupled to the plurality of hardware devices;
   validation logic to permit controlled access to the at least one API to support the remotely hosted user interface, wherein the validation logic only permits access to limited aspects of the at least one API; and
   a network communication interface to communicate with a computer data network, wherein the network device is accessible to the end user device via the computer data network,
   wherein the end user device is configured to specifically tailor the remotely hosted user interface to the network device, and
   wherein the remotely hosted user interface is based on a generic user interface that is modified based on particular capabilities of the network device to customize the remotely hosted user interface with respect to the network device.

7. The network device of claim 6, wherein the network device is one of a set top box, a phone, and a gaming device.

8. The network device of claim 6, wherein a computer server uses the at least one API as an interface to remotely host the user interface for display and control of the device settings, wherein the computer server is accessible over the computer data network to the end user device.

9. The network device of claim 6, wherein the end user device includes a network device servicing application and wherein the network device servicing application is operative to call the at least one API of the network device.

10. The network device of claim 6, wherein at least some of the device settings correspond to a particular hardware device connected to the network device, wherein the particular hardware device is one of the plurality of hardware devices, and wherein in response to the end user of the end user device identifying modifications to the device settings corresponding to the particular hardware device connected to the network device, the end user device interacts with the at least one API to apply the identified modifications to the device settings corresponding to the particular hardware device connected to the network device.

11. A personal computer device coupled to a network device, the personal computer device comprising:
   a processor; and
   a memory including processor executable instructions that are executable by the processor to perform operations of a network service application using an integrated user interface at the personal computer device, the network service application including instructions executable by the processor to send security information usable to authorize controlled access to at least one application programming interface (API), the controlled access only permitting access to limited aspects of the at least one API, at the network device to support the integrated user interface and to make function calls to the at least one API at the network device to retrieve and display device settings of the network device, wherein the device settings are displayable and modifiable via the integrated user interface at the personal computer device, wherein the modification occurs after establishing access by the personal computer device to the network device, wherein the device settings include configuration data of at least one of a plurality of hardware devices coupled to the network device, the plurality of hardware devices including a data router, wherein the end user device is configured to specifically tailor the remotely hosted user interface to the network device, and wherein the remotely hosted user interface is based on a generic user interface that is modified based on particular capabilities of the network device to customize the remotely hosted user interface with respect to the network device.

12. The personal computer device of claim 11, wherein the network service application is loaded into the memory from a computer readable media device that is provided as a package with the network device.

13. The personal computer device of claim 11, wherein the network device is accessible by the personal computer device via a network connection and wherein the integrated user interface is stored in the memory.

14. The network device of claim 11, wherein the remotely hosted user interface is a web user interface that supports the end user device to make changes to configuration data within the network device, the configuration data including data corresponding to a wireless data communication device.

15. The personal computer device of claim 11, wherein the network device provides access to the at least one API via a remotely located web server over a computer data network, the at least one API corresponding to at least one of the plurality of hardware devices.

\* \* \* \* \*